United States Patent
Sasatani

(10) Patent No.: US 6,987,137 B1
(45) Date of Patent: Jan. 17, 2006

(54) MATERIAL FOR FORMING RESIN SUITABLE FOR CUTTING, MOLDED RESIN PRODUCT AS RAW MATERIAL FOR MODEL, AND METHOD FOR MANUFACTURING MODEL

(75) Inventor: Yuichi Sasatani, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 09/958,002

(22) PCT Filed: Mar. 29, 2000

(86) PCT No.: PCT/JP00/01977

§ 371 (c)(1),
(2), (4) Date: Sep. 27, 2001

(87) PCT Pub. No.: WO00/60013

PCT Pub. Date: Oct. 12, 2000

(30) Foreign Application Priority Data

Apr. 2, 1999 (JP) ................................ 11/096974

(51) Int. Cl.
*C08K 9/10* (2006.01)

(52) U.S. Cl. ...................................... 523/210; 523/218
(58) Field of Classification Search ................ 523/210, 523/218
See application file for complete search history.

(56) References Cited

U.S. PATENT DOCUMENTS 5,322,862 A * 6/1994 Kurata et al. ............... 523/122

FOREIGN PATENT DOCUMENTS

| GB | 2 334 960 | 9/1999 |
|----|-----------|--------|
| JP | 63-116888 | 5/1988 |
| JP | 63-225659 | 9/1988 |
| JP | 7-206622 | 8/1995 |
| JP | 7-292217 | 11/1995 |
| JP | 10-110391 | 4/1998 |
| WO | WO 98/17703 | 4/1998 |

* cited by examiner

*Primary Examiner*—Edward J. Cain
(74) *Attorney, Agent, or Firm*—Hamre, Schumann, Mueller & Larson, P.C.

(57) ABSTRACT

This invention relates to a machinable or grindable resin-forming material, comprising (A) a machinable or grindable resin or a precursor thereof, and (B) microcapsules comprising an encapsulated material (a) in liquid state and a wall material (b); wherein the machinable or grindable resin-forming material includes (B) at a ratio of 0.5 to 90 mass parts with respect to 100 mass parts of (A), and to a resin molded product for material of a model, which is formed by melting and solidifying or hardening and shaping the machinable or grindable resin-forming material. Accordingly, a machinable or grindable resin-forming material and a resin molded product for material of a model, in which the amount of scattering dust at the time of cutting or grinding the resin molded product is reduced, and a decrease in the strength is small, can be provided.

11 Claims, No Drawings

MATERIAL FOR FORMING RESIN SUITABLE FOR CUTTING, MOLDED RESIN PRODUCT AS RAW MATERIAL FOR MODEL, AND METHOD FOR MANUFACTURING MODEL

TECHNICAL FIELD

The present invention relates to a machinable or grindable (cuttable or grindable) resin-forming material, a resin molded product for material of a model, and a method for producing a model.

More specifically, the present invention relates to a resin molded product for material of model, characterized in that when cutting or grinding the resin molded product, the dust generated tends not to fly in the air and the working environment tends not to deteriorate; a machinable or grindable resin-forming material that provides the resin molded product; and a method for producing a model with reduced amount of scattering dust.

BACKGROUND ART

A resin molded product for a material of a model such as a master model or a mock-up model is supplied as a model or a mold, after being formed into an arbitrary shape by cutting or grinding.

In recent years, because of various conditions such as a decrease in the number of wooden patternmakers, improvement in computers, the requirement for a shortened delivery period of model production, etc., model production by cutting or grinding with an NC (numerical control) machine has become a major method.

The dust generated when cutting or grinding a resin molded product for material of a model by an NC machine causes contamination of the working environment. Thus, the amount of generated dust may be reduced by a method in which liquid with a low chemical activity such as an ester compound or an ether compound in which the hydroxyl groups at both ends of a (poly)oxyalkylene compound, e.g. a polyalkylene glycol, are blocked with a fatty acid or a higher alcohol, is included in a resin (Publication of International Patent Application WO 98/17703).

However, this method may lead to a reduction in the strength of the material, and a finished model may be damaged or deformed easily. Therefore, although this method can be applied to a material of a mock-up model that may have relatively low strength, it may not be desirable to apply this method to a material of a master model or a mold that requires strength.

As a result of intensive investigation to solve the above problem, the inventors have found that by including microcapsules containing an encapsulated material in a liquid state into a resin composition, it is possible to obtain a resin molded product for material of a model, in which the amount of dust generated by cutting or grinding is small and a decrease in the strength is small. Thus, the present invention has been accomplished.

SUMMARY OF THE INVENTION

Thus, the present invention provides (I) to (IV) as follows:
(I) A machinable or grindable resin-forming material, comprising (A) a machinable or grindable resin or a precursor thereof; and (B) microcapsules comprising an encapsulated material (a) in a liquid state and a wall material (b); wherein the machinable or grindable resin-forming material includes (B) at a ratio of 0.5 to 90 mass parts with respect to 100 mass parts of (A).
(II) A resin molded product for material of a model, which is formed by melting and solidifying or hardening and shaping the material (I).
(III) A method for producing a model, which comprises cutting or grinding the molded product (II).
(IV) Use of microcapsules (B) comprising an encapsulated material (a) in a liquid state and a wall material (b) to reduce the amount of scattering dust when cutting or grinding a resin molded product for material of model.

DETAILED DESCLOSURE OF THE INVENTION

In the present invention, the encapsulated material (a) constituting the microcapsules (B) is in a liquid state at 20° C. at 1 atm. Because a cutting or grinding operation is often carried out mainly in a place without any temperature control equipment, to make (a) in a liquid state in the cold period, it is preferable that the freezing point of (a) is not higher than −5° C., more preferably not higher than −10° C.

Because the temperature on the cutting or grinding face may increase due to the heat of cutting or grinding by 70° C. or more depending on the cutting or grinding conditions, it is preferable that the boiling point of (a) is not lower than 80° C., more preferably not lower than 120° C.

To cause (a) to scatter instantly at the time of cutting or grinding and allow it to adhere to the cut dust easily, it is preferable that the viscosity of (a) at 20° C. is not more than 5000 mPa·s, more preferably not more than 3000 mPa·s, particularly preferably from 50 to 2500 mPa·s.

To reduce the amount of dust when cutting or grinding, it is necessary that the machinable or grindable resin-forming material includes at least 0.5 mass parts of (B) with respect to 100 mass parts of (A). To maintain the strength as a resin molded product for material of model, it is necessary that the machinable or grindable resin-forming material includes not more than 90 mass parts of (B) with respect to 100 mass parts of (A). Taking into consideration that when the condition of cutting or grinding is severe, part of (a) may not be able to adhere to the dust, and may fall directly on the model, the NC machine, etc. other than the dust, and taking into account the ease and economic efficiency when including (B) into (A), it is more preferable that the machinable or grindable resin-forming material includes from 1 to 50 mass parts of (B) with respect to 100 mass parts of (A).

The encapsulated material (a) thus described is not particularly limited as long as it is in a liquid state at 20° C. and has no adverse effect on (A). It includes those materials nonreactive with (A), and those reactive with (A) but with no substantial influence on (A). The encapsulated material (a) may be either a synthetic organic compound or a natural organic compound, and may be water-soluble or oil-soluble. Combinations of two or more kinds thereof also may be employed.

It is preferable that the number-average molecular weight of (a) measured by gel permeation chromatography is not more than 3000, more preferably from 70 to 2500.

The synthetic organic compound used as (a) may be any of an aliphatic compound, an alicyclic compound, and an aromatic compound.

Specific examples of the synthetic organic compound are hydrocarbons having a molecular weight of 70 to 250 (linear, branched or alicyclic saturated aliphatic hydrocarbons, e.g. n-heptane, n-octane, isooctane, n-hexadecane, cyclohexane; unsaturated aliphatic hydrocarbons, e.g.

1-octene; aromatic hydrocarbons, e.g. cumen), monohydric alcohols with a molecular weight of 100 to 270 (linear, branched or alicyclic aliphatic alcohols, e.g. 1-heptanol, n-nonyl alcohol, 2-ethylhexylalcohol; aromatic ring-containing alcohols, e.g. cuminic alcohol), dihydric alcohols (i.e. glycols) with a molecular weight of 60 to 270 (e.g. ethylene glycol, propylene glycol, 1,4-butanediol, etc.), alcohols having 3 to 6 hydroxyl groups and a molecular weight of 90 to 270 (glycerol, trimethylolpropane, diglycerol, etc.), aliphatic or aromatic esters with a molecular weight of 130 to 500 (n-nonyl acetate, octyl acetate, isoamyl butyrate, di-2-ethylhexyl adipate, benzyl acetate, dibutyl phthalate, etc.), ketones with a molecular weight of 100 to 270 (methyl amyl ketone, 2-octanone, 3-octanone, etc.), mono or diethers with a molecular weight of 70 to 300 {diisobutyl ether, diisoamyl ether, benzyl ethyl ether, monoalkyl ethers (1 to 8 carbon atoms in the monoalkyl group) of the above-described glycols (e.g. "ethylcellosolve" (β-hydroxydiethyl ether)), dialkyl ethers (the alkyl group of the "dialkyl" has 1 to 8 carbon atoms) of the above-described glycols (e.g. ethylene glycol diethyl ether), etc.}, and polyethers with a number-average molecular weight of not more than 3000 {polyethylene glycol, polypropylene glycol, propylene oxide adducts to glycerol (not more than 50 moles adducts), (hereinafter, "propylene oxide" is abbreviated as "PO"), PO adducts to pentaerythritol (not more than 50 moles adducts), polyoxyalkylene monoalkyl ethers (the "polyoxyalkylene" group has 2 to 4 carbon atoms in the alkylene group, the "polyoxyalkylene" segment has a polymerization degree of not more than 66; these also apply to the polyoxyalkylene groups in the following compounds; and the monoalkyl group has 1 to 8 carbon atoms), polyoxyalkylene dialkyl ethers (the alkyl group in the "dialkyl" has 1 to 8 carbon atoms), polyoxyalkylene alkyl phenyl ethers (the alkyl group has 1 to 8 carbon atoms), aliphatic acid mono and/or diesters of polyalkylene glycols (the polyalkylene glycol segment has a polymerization degree of not more than 66, an aliphatic acid residue has 12 to 24 carbon atoms), polyoxyethylene polyoxypropylene block polymers, etc.).

Among these synthetic organic compounds, hydrocarbons, alcohols, esters and polyethers are preferred from the aspect of stability, safety and sanitation. More preferred are saturated aliphatic hydrocarbons with a molecular weight of 70 to 250.

Natural organic compounds used as (a) include mineral oils or purified products thereof (spindle oil, liquid paraffin, etc.), plant oils (olive oil, castor oil, rape seed oil, etc.), animal oils (sperm oil, beef oil, squalene, etc.), and purified or modified products of these animal and plant oils (purified castor oil, polyhydric alcohol-modified castor oil, squalane, etc.).

Among these natural organic compounds, and also among all examples of (a), mineral oils, animal and plant oils, and modified products thereof are preferred in the aspect of availability and cost.

The wall material (b) constituting (B) is not particularly limited, and thermoplastic resins, thermosetting resins, etc. may be used as (b).

The thermoplastic resins include styrene-based resins (polystyrene, acrylonitrile-styrene resins, acrylonitrile-butadiene-styrene resins, styrene-butadiene resins, etc.), polyamide resins (6-nylon, 66-nylon, 12-nylon, etc.), polyethylene-based resins {polyethylene, ethylene-α-olefin copolymers (the α-olefin has 3 to 6 carbon atoms), ethylene-vinyl acetate copolymers, etc.}, polypropylene-based resins {polypropylene, propylene-α-olefin copolymers (the α-olefin has 4 to 6 carbon atoms), etc.}, (meth)acrylic resins {alkyl acrylate polymers having 1 to 12 carbon atoms in the alkyl group, alkyl methacrylate polymers having 1 to 12 carbon atoms in the alkyl group, etc.}, polyacrylonitrile, thermoplastic polyester resins (polyethylene terephthalate, polybutylene terephthalate, polycarbonate, etc.), thermoplastic polyurethane resins, polyoxyalkylene-based resins having 2 to 4 carbon atoms in the alkylene group, polyacetal resins, polyvinyl chloride, polyvinylidene chloride, and polyphenylene sulfide resins. Combinations of two or more kinds thereof also may be used.

The thermosetting resins include epoxy resins (e.g. epoxy resins such as bisphenol epoxy resins, novolak epoxy resins and alicyclic epoxy resins cured with polyamines, acid anhydrides, etc.), unsaturated polyester resins (e.g. crosslinked copolymers of unsaturated polyesters derived from glycol, unsaturated dibasic acids and saturated dibasic acids with other vinyl monomers), phenol resins (e.g. phenol-formaldehyde resins, phenol-furfural resins), polyimide resins, thermosetting polyurethane resins, melamine resins, urea resins, etc. Combinations of two or more kinds thereof also may be used.

Among the thermoplastic resins, polyacrylonitrile and (meth)acrylic resins, copolymers thereof, and vinylidene chloride resins are preferred. Among the thermosetting resins, phenol resins are preferred.

Among these, polyacrylonitrile, alkyl acrylate polymers, alkyl methacrylate polymers, and copolymers thereof are more preferred from the aspect of good machinability or grindability.

When the wall material (b) is a thermoplastic resin, because of the increased temperature due to the cutting or grinding heat, it is preferable that the melting point of (b) is at least 100° C. Considering severe conditions of cutting or grinding, it is more preferable that the melting point is from 120° C. to 250° C.

It is preferable that (b) is used with a film thickness of 0.01 to 100 $\mu$m.

The method of producing the microcapsules (B) is not particularly limited, and any conventional method may be employed. Representative examples of the production method are coacervation, interfacial polymerization, in-situ polymerization, etc.

Coacervation is used widely. For example, microcapsules including an encapsulated material such as colorless dye for copy paper or liquid crystal, etc. with gelatin as a wall material are produced by coacervation.

In the interfacial polymerization, a polymerization reaction is caused at the interface between an aqueous phase including a hydrophilic monomer and an oil phase including a lipophilic liquid to form microcapsules. Many microcapsules using polyurethane, polyurea, epoxy resins, etc. as wall materials are produced by this method.

In in-situ polymerization, a monomer and a catalyst are included in either of two phases that are immiscible with each other, and the monomer is polymerized at the interface so as to form a uniform film on the surface of an encapsulated material. As the wall material, copolymers of styrene and maleic anhydride, copolymers of ethylene and maleic anhydride, arabic rubber, polyacrylic acid, acrylic acid/acrylic acid ester copolymers, melamine-formalin resins, polyurethane resins, etc. may be used.

Microcapsules produced by interfacial polymerization and in-situ polymerization are favorable as (B) from the aspect of the ranges of selection of the wall material, the encapsulated material and the particle size, and the stability of the capsules. From the aspect of cost, microcapsules produced by in-situ polymerization are more preferred.

The surface of (B) may be coated with an inorganic filler, e.g. talc, calcium carbonate, etc.

Because of the ease of handling and less decrease in the strength when included in the resin composition, it is preferable that the volume-average particle size (median) of (B) measured by a laser diffraction type particle-size distribution measuring apparatus is from 1 $\mu$m to 1500 $\mu$m, more preferably from 3 $\mu$m to 1000 $\mu$m.

When considering economic efficiency and handling properties, it is preferable that the amount z of the encapsulated oil in (B), which is expressed by the equation $z=x\times100/y$ [z is the amount (volume %) of an encapsulated oil per one microcapsule; x is the volume of the encapsulated material (a) contained in one microcapsule; y is the volume of one microcapsule] is at least 40 volume %, more preferably from 50 to 90 volume %. The "encapsulated oil" herein refers to the encapsulated material (a).

The machinable or grindable resin or a precursor thereof (A) is not particularly limited as long as it is to be a resin having machinability or grindability. For example, the precursors of thermosetting resins exemplified above for use as (b) may be employed. Further, the thermoplastic resins exemplified above for use as (b) may be employed. The resin of (b) may be either the same as or different from (A) or a resin obtained from (A).

When (A) is a thermoplastic resin, it is preferable that the melting point of (A) is not higher than 180° C., more preferably from 120° C. to 160° C. When the melting point is higher than 180° C., the microcapsules might dissolve during the production of a compound or during molding.

Among these precursors of thermosetting resins and the thermoplastic resins, preferred are those to become hard resins with a Shore D hardness of at least 60 (particularly between 62 and 95) when used alone and subjected to reaction hardening (in the case of thermosetting resins) or melting and solidifying (in the case of thermoplastic resins) without decreasing their densities by foaming, etc. Such resins include epoxy resins, rigid polyurethane resins, acrylonitrile-butadiene-styrene resins, polyethylene-based resins, polypropylene-based resins, and the like.

Because of the wide range of selection for raw material components that allows suitable use for various properties required for a resin molded product for material of model, ease of mixing with the microcapsules (B) and below-described additive (C), and ease of molding, precursors of epoxy resins and rigid polyurethane resins are more preferred as (A). Particularly preferred are precursors of rigid polyurethane resins. The rigid polyurethane resins are favorable, because an additive (C) can be mixed in raw materials comprising a polyol component and an organic polyisocyanate component, and the mixture can be hardened and shaped into a desired form.

The above-mentioned precursors of epoxy resins usually comprise a commonly used polyepoxide having at least two epoxy groups in one molecule and a polyamine-based hardening agent or an acid anhydride-based hardening agent.

Examples of the polyepoxide include polyglycidyl ethers obtained by reacting an epihalohydrin (e.g. epichlorohydrin) or a dihalohydrin (e.g. glycerol dichlorohydrin) with a polyhydric (2 to 6 hydroxyl groups or more) phenols having 6 to 50 carbon atoms or more {e.g. bisphenol A, bisphenol F, 1,1-bis(4-hydroxyphenyl)ethane, resorcinol, hydroquinone, catechol, nuclear-substituted products thereof, halogen compounds thereof, etc.} or a polyhydric (2 to 6 hydroxyl groups or more) alcohols having 2 to 100 carbon atoms {e.g. alkane polyols (e.g. ethylene glycol, propylene glycol, 1,3-butanediol, 1,4-butanediol, trimethylolpropane, glycerol, pentaerythritol), polyalkylene glycols having a number-average molecular weight of not more than 3000 (2 to 4 carbon atoms in the alkylene group) (e.g. diethylene glycol, triethylene glycol, tetraethylene glycol, polyethylene glycol), etc.}; or polyglycidyl esters obtained by reacting an epihalohydrin or a dihalohydrin with an aliphatic or aromatic polycarboxylic acid having 6 to 20 carbon atoms or more and having 2 to 6 carboxyl groups or more (e.g. oxalic acid, fumaric acid, maleic acid, succinic acid, glutaric acid, adipic acid, phthalic acid, isophthalic acid, terephthalic acid, tetrahydrophthalic acid, and halogen compounds thereof).

Among these, polyglycidyl ethers of polyhydric phenols are preferred, and glycidyl ethers of bisphenol A, bisphenol F, and 1,1-bis(4-hydroxyphenyl)ethane are more preferred. Furthermore, those having a viscosity at 25° C. of not more than 15,000 mPa·s and an epoxy equivalent of 180 to 200 are preferred.

Examples of the polyamine-based hardening agent include aliphatic polyamines having 2 to 18 carbon atoms, alicyclic polyamines having 4 to 15 carbon atoms, aromatic polyamines having 6 to 20 carbon atoms, heterocyclic polyamines having 4 to 15 carbon atoms, polyamideamine-based hardening agents, etc.

The aliphatic polyamines include alkylenediamines having 2 to 6 carbon atoms (e.g. ethylenediamine, propylenediamine, tetramethylenediamine), polyalkylene polyamines (dialkylenetriamines to hexaalkyleneheptamine having 2 to 6 carbon atoms in the alkylene group) (e.g. diethylenetriamine, triethylenetetramine, tetraethylenepentamine, pentaethylenehexamine, iminobispropylamine, bis(hexamethylene)triamine}, substituted products thereof with an alkyl group having 1 to 4 carbon atoms or a hydroxyalkyl group having 2 to 4 carbon atoms {e.g. dialkylaminopropylamine (1 to 4 carbon atoms in the alkyl group of the "dialkyl"), diethylaminopropylamine, aminoethylethanolamine}, diethylene glycol bispropylenediamine, aromatic ring-containing aliphatic polyamines having 8 to 15 carbon atoms (e.g. metaxylylenediamine).

The alicyclic polyamines include isophoronediamine, bis(4-amino-3-methylcyclohexyl)methane, etc.

The aromatic polyamines include metaphenylenediamine, diaminodiphenylmethane, etc.

The heterocyclic polyamines include N-aminoethylpiperazine, etc.

The polyamideamine-based hardening agents include those obtained by reacting a dimer acid containing a polymerized aliphatic acid having 36 carbon atoms as a main component, with an excessive amount (at least 2 moles per one mole of the acid) of a polyamine (e.g. the above-described alkylenediamines and polyalkylenepolyamines). The dimer acid is produced by heat polymerizing an unsaturated fatty acid containing linoleic acid or oleic acid as a main component in the presence of a catalyst.

Examples of the acid anhydride-based hardening agents include aromatic acid anhydrides {e.g. phthalic anhydride, trimellitic anhydride, ethylene glycol bis(anhydrotrimellitate), glycerol tris(anhydrotrimellitate), pyromellitic anhydride, 3,3',4,4'-benzophenonetetracarboxylic acid anhydride}, aliphatic acid anhydrides (maleic anhydride, succinic anhydride, tetrahydro phthalic anhydride, methyltetrahydro phthalic anhydride, "nadic methyl anhydride" (methyl-5-norbornene-2,3-dicarboxylic anhydride), alkenyl succinic anhydrides having 8 to 12 carbon atoms in the alkenyl group, hexahydro phthalic anhydride, methylhexahydro phthalic anhydride, methylcyclohexenetetracarboxylic acid anhydride, polyadipic acid anhydride (weight-average molecular weight: 750 to 850), polyazelaic acid anhydride (weight-average molecular weight: 1200 to 1300), and polysebacic acid anhydride (weight-average molecular weight: 1600 to 1700).

Among these hardening agents, polyamine-based hardening agents are preferred, and aliphatic polyamines having 2 to 18 carbon atoms are more preferred. Furthermore, those having a viscosity at 25° C. of not more than 15,000 mPa·s are preferred.

It is preferable that the ratio of these hardening agents used is between 0.25 and 2.0, more preferably between 0.5 and 1.75 equivalent of a hardening agent with respect to epoxy equivalent.

The above-mentioned precursors of rigid polyurethane resins usually comprise a polyol component and an isocyanate component.

Examples of the polyol component used in the polyurethane resin include polyether polyols, polyester polyols, and other polyols.

The polyether polyols include, for example, compounds in which an alkylene oxide is added to a compound having at least two (preferably from 3 to 8) active hydrogen atoms, e.g. polyhydric alcohols, polyhydric phenols, amines, polycarboxylic acids and phosphoric acids, and mixtures thereof.

Among the polyhydric alcohols, those having 2 to 8 hydroxyl groups are preferred, and combinations of two or more kinds thereof also may be used. Specific examples are aliphatic dihydric alcohols having 2 to 12 carbon atoms, e.g. ethylene glycol, propylene glycol, 1,4-butanediol and diethylene glycol; aliphatic alcohols having 3 to 8 hydroxyl groups and having 3 to 12 carbon atoms, e.g. glycerol, trimethylolpropane, pentaerythritol, methylglucoside, diglycerol, sorbitol and sucrose; alicyclic alcohols having 6 to 18 carbon atoms, e.g. cyclohexylene glycol, cyclohexane dimethanol; aromatic alcohols having 8 to 20 carbon atoms, e.g. 1,4-bis(hydroxyethyl)benzene; and the like.

Examples of the polyhydric phenol include hydroquinone, bisphenols (e.g. bisphenol A, bisphenol F), condensed products of phenol and formaldehyde, etc.

Aliphatic amines among the amines include alkanolamines (e.g. diethanolamine, triethanolamine), alkylamines having 1 to 20 carbon atoms in the alkyl group (e.g. ethylamine), alkylenediamines having 2 to 6 carbon atoms in the alkylene group (e.g. ethylenediamine, hexamethylenediamine), polyalkylenepolyamines {dialkylenetriamines to hexaalkyleneheptamines having 2 to 6 carbon atoms in the alkylene group (e.g. diethylenetriamine, triethylenetetramine)}, etc.

Further examples of the amines include aromatic amines having 6 to 20 carbon atoms (e.g. toluenediamine, diphenylmethanediamine), alicyclic amines having 4 to 15 carbon atoms (e.g. isophoronediamine, cyclohexylenediamine), and heterocyclic amines having 4 to 15 carbon atoms (e.g. aminoethylpiperazine), etc.

As the polycarboxylic acids, those described below may be used.

Among these, polyhydric alcohols are preferred.

As the alkylene oxide that is added to an active hydrogen atom-containing compound, those having 2 to 8 carbon atoms are preferred. Specific examples are ethylene oxide (EO), PO, 1,2-, 2,3-, 1,4- or 2,4-butylene oxide, styrene oxide, and the like, and combinations thereof (by block and/or random addition). Among these, PO and combinations of EO and PO are particularly preferred.

Specific examples of the polyether polyols are PO adducts of glycerol, trimethylolpropane, triethanolamine, pentaerythritol, sorbitol and sucrose.

Examples of the polyester polyols include condensed polyester polyols from polycarboxylic acids and polyols, and lactone polyester polyols formed by ring-opening polymerization of lactone.

The polycarboxylic acids include aliphatic dicarboxylic acids having 2 to 10 carbon atoms or anhydrides thereof (e.g. adipic acid, sebacic acid, maleic anhydride), aromatic polycarboxylic acids having 8 to 14 carbon atoms and having 2 to 4 carboxyl groups in the aromatic ring (e.g. phthalic anhydride, terephthalic acid, trimellitic acid, pyromellitic acid), etc. Preferred are phthalic anhydride and terephthalic acid. The polyols include the polyhydric alcohols described in the above section of polyether polyols, and low molar (usually from 1 to 3 moles) alkylene oxide adducts thereof. Preferred are 1,4-butane diol, ethylene glycol, and diethylene glycol.

Specific examples of the condensed polyester polyols are poly(1,4-butanediol adipate), poly(1,4-butanediol terephthalate) and poly(diethylene glycol) terephthalate.

As the lactone in the lactone polyester polyols, usually a lactone having 3 to 7 carbon atoms is used, e.g. ε-caprolactone, δ-valerolactone, etc. Preferably ε-caprolactone is used. A specific example of the lactone polyester polyols is poly(ε-caprolactone) polyol.

Other polyols include polyether polyols grafted with a homopolymer or a copolymer of vinyl compounds such as acrylonitrile, styrene and methyl methacrylate; polybutadiene polyols; hydroxyl-containing vinyl polymers; etc.

The hydroxyl value of each polyol exemplified above is preferably from 200 to 700, more preferably from 250 to 600. When the hydroxyl value is at least 200, the obtained polyurethane molded product has heat resistance and strength. When the hydroxyl value is not more than 700, scorching is not caused by the reaction heat during molding, and the obtained molded product has good machinability or grindability.

As the polyol component, polyols having a hydroxyl value of less than 200 [e.g. high molecular weight polyether polyols, castor oils (e.g. castor oil and polyol-modified castor oils), etc.], polyols having a hydroxyl value of more than 700 (e.g. those exemplified as polyhydric alcohols in the above section of polyether polyols), and polyamines (e.g. diethyltolylenediamine, 2,2', 3,3'-tetrachloro-4,4'-diaminodiphenylmethane), etc. may be used with a polyol having the above-specified hydroxyl value to the extent so that the characteristics required as a material for cutting or grinding are not impaired, preferably in the range of not more than 30 mass % with respect to the polyol having the above-specified hydroxyl value.

Among the examples of the polyol component, preferred are polyether polyols, particularly alkylene oxide adducts to polyhydric alcohols. Particularly preferred are PO adducts of glycerol, trimethylolpropane, triethanolamine, pentaerythritol, sorbitol and sucrose.

As the organic polyisocyanate component, those conventionally used in the production of urethane foams may be used.

Examples of such isocyanate include aromatic polyisocyanates, aliphatic polyisocyanates, alicyclic polyisocyanates and araliphatic polyisocyanates, and modified products thereof (e.g. modified with carbodiimide, allophanate, urethane, urea, biuret, isocyanurate, oxazolidone, etc.), and mixtures of at least two or more kinds thereof.

The aromatic polyisocyanates include aromatic diisocyanates having 6 to 16 carbon atoms (except the carbon in the NCO group; this also applies to the following polyisocyanates), aromatic triisocyanates having 6 to 20 carbon atoms, and crude products of these isocyanates, etc. Specific examples are 1,3- and 1,4-phenylene diisocyanates, 2,4- and 2,6-tolylene diisocyanates (TDI), crude TDI, 2,4'- and 4,4'-diphenylmethane diisocyanates (MDI), polymethylene polyphenyl isocyanates (crude MDI), naphthylene-1,5-diisocyanate, triphenylmethane-4,4', 4"-triisocyanate, etc.

The aliphatic polyisocyanates include aliphatic diisocyanates having 6 to 10 carbon atoms, etc. Specific examples are 1,6-hexamethylene diisocyanate, 2,2,4-trimethylhexamethylene diisocyanate, lysine diisocyanate, etc.

The alicyclic polyisocyanates include alicyclic diisocyanates having 6 to 16 carbon atoms, etc. Specific examples are isophorone diisocyanate, 4,4'-dicyclohexylmethane diisocyanate, 1,4-cyclohexane diisocyanate, norbornane diisocyanate, etc.

The araliphatic isocyanates include araliphatic diisocyanates having 8 to 12 carbon atoms, etc. Specific examples are xylylene diisocyanate, α,α,α',α'-tetramethylxylylene diisocyanate, etc.

Specific examples of the modified polyisocyanates are urethane-modified MDI, carbodiimide-modified MDI, sucrose-modified TDI, castor oil-modified MDI, etc.

Among these, aromatic polyisocyanates are preferred, and polymethylene polyphenyl isocyanates are particularly preferred.

The ratio of the polyol component to the organic polyisocyanate component when producing a polyurethane resin may be varied. From the aspect of the strength of the resin, it is preferable that the isocyanate index [equivalent ratio of (NCO groups/active hydrogen atom-containing groups) ×100] is between 80 and 140, more preferably between 85 and 120.

The reaction method may be either a one-shot method or a prepolymer method in which part of a polyol component is preliminarily reacted with an organic polyisocyanate component.

By including an additive (C) in (A) as needed, a more favorable resin molded product for material of model may be formed.

Examples of the additive (C) include fillers, dehydrating agents, lubricants, foam stabilizers, defoaming agents, catalysts, coloring agents, flame retardants, age resistors, plasticizers, etc.

A filler (C1) may be added to increase the strength and the thermal dimensional stability of the resin composition or to reduce the weight of the resin composition.

Examples of (C1) include metal powder or fiber (iron powder, aluminum powder, etc.), inorganic powder or fiber (powder or fiber of glass, carbon, ceramics, talc, calcium carbonate, etc.), powder or fiber formed of a polymer (powder or fiber of vinylon, "Kevlar" (manufactured by Du Pont), an acrylic resin, etc.), hollow microspheres (glass microballoon, acrylic microballoon, phenolic microballoon, etc.), etc.

In a resin molded product for material of model that requires strength and/or thermal dimensional stability, it is preferable to use a metal powder, an inorganic powder or a fiber, more preferably an inorganic powder. To reduce the weight of the resin composition, it is preferable to use hollow microspheres. Among them, acrylic microballoon and phenolic microballoon are preferred.

It is preferable that the mixed amount of (C1) is not more than 80 mass parts, more preferably from 0.5 to 60 mass parts, particularly preferably from 1 to 50 mass parts with respect to 100 mass parts of (A).

As the additive (C), lubricants (e.g. calcium stearate, ethylenediamine distearylamide), foam stabilizers (silicone-based foam stabilizers, e.g. polyoxyalkylene dialkyl polysiloxane), defoaming agents (e.g. dimethyl siloxane copolymer, silicone), catalysts (amine-based catalysts, e.g. triethylenediamine; metal-based catalysts, e.g. dibutyl tin dilaurate; etc.), coloring agents (e.g. metal oxide, dis-azo pigment), flame retardants (e.g. phosphoric acid ester, antimony oxide), age resistors (e.g. nickel dibutyldithiocarbamate, hindered phenol), plasticizers {phthalic acid dialkyl esters (the alkyl group in the "dialkyl esters" has from 1 to 10 carbon atoms), e.g. dibutyl phthalate; adipic acid dialkyl esters (the alkyl group in the "dialkyl esters" has from 1 to 10 carbon atoms), e.g. di-2-ethylhexyl adipate; etc.}, and in the case of polyurethane resins, dehydrating agents (e.g. calcium sulfate, molecular sieve), etc. may be added further as appropriate.

It is preferable that the amount of a lubricant mixed is not more than 20 mass parts, more preferably from 0.2 to 15 mass parts with respect to 100 mass parts of (A).

It is preferable that the amount of a plasticizer mixed is not more than 20 mass parts, more preferably from 0.2 to 10 mass parts with respect to 100 mass parts of (A).

It is preferable that the amount of a catalyst mixed is not more than 1 mass part, more preferably from 0.005 to 0.2 mass parts with respect to 100 mass parts of (A).

It is preferable that the amount of a dehydrating agent mixed is not more than 10 mass parts, more preferably from 0.2 to 8 mass parts with respect to 100 mass parts of (A).

It is preferable that the amount of a foam stabilizer, a defoaming agent, a coloring agent, a flame retardant or an age resistor mixed is each not more than 3 mass parts, more preferably from 0.1 to 2 mass parts with respect to 100 mass parts of (A).

The method for producing a machinable or grindable resin-forming material of the present invention from a machinable or grindable resin or a precursor thereof (A) and microcapsules (B) is not particularly limited, as long as (B) are dispersed uniformly in (A). For example, (B) may be mixed in a part of a thermoplastic resin or a precursor of a thermosetting resin using a planetary mixer, a kneader, a hand mixer, a vertical mixing vessel with mixing blades or the like. Among these mixing apparatuses, a planetary mixer is preferred.

When using an additive (C), in the above-described manner, (C) also may be mixed and dispersed in (A). Thus, (B) and (C) may be mixed and dispersed in (A) simultaneously by the above-described method.

In the case of a thermoplastic resin, a method in which powder of a thermoplastic resin is mixed with microcapsules (B) as powder, and then the mixture is heated at the time of molding to melt the thermoplastic resin may be employed. Or a method in which microcapsules (B) are put into a preliminarily melted thermoplastic resin and mixed in it may be employed. The preferred method is mixing both powders with each other.

In the case of a thermosetting resin, for example, when obtaining a resin molded product for material of model comprising a thermosetting polyurethane resin, a method in which microcapsules (B) are dispersed in the above-described polyol component, and thereafter the dispersion is reacted with the organic polyisocyanate component by a conventional method may be employed. Or a method in which microcapsules (B) are dispersed in the organic polyisocyanate component, and thereafter the dispersion is reacted with the polyol component may be employed. The former method is preferred.

A resin molded product for material of model according to the present invention can be obtained, when (A) is a thermoplastic resin, by melting and solidifying a machinable or grindable resin-forming material of the present invention at a temperature of not lower than its melting point; and when (A) is a thermosetting resin, by hardening and shaping a machinable or grindable resin-forming material of the present invention.

When producing a resin molded product for material of model comprising a thermoplastic resin, it can be produced continuously using a conventional extruder (single-screw or twin-screw extruder), a continuous kneader or the like after mixing (A) and (B).

The resin molded product for material of model may be a resin foamed molded product having a density of 0.05 to 0.95 g/cm$^3$, a molded product composed of almost only a resin and having a density of 0.95 to 1.25 g/cm$^3$, or a non-foamed molded product containing an inorganic filler and having a density of 1.25 to 2 g/cm$^3$. It is preferable that the resin molded product for material of model is a foamed resin so as to improve its machinability or grindability by decreased density. A polyurethane resin foamed molded product is particularly preferred in that its density can be decreased easily by foaming.

When obtaining a foamed molded product, for example, in the case of foaming a polyurethane resin, a foaming method using a blowing agent may be employed. In this method, a volatile blowing agent such as fluorocarbon, hydrogen atom-containing halogenated hydrocarbon or a low boiling point hydrocarbon, or water as a source of generating carbon dioxide gas, etc. is added during and/or before the mixing of a polyol component with an organic polyisocyanate component. Also, a mechanical froth foaming method may be employed in which an inactive gas such as air or nitrogen is blown during the mixing of the above-described components.

The mechanical froth foaming method is particularly preferred in that the bubbles after foaming have a small size and are dispersed uniformly, and the density distribution in the obtained cured product is uniform.

In the mechanical froth foaming method, a mechanical froth foaming machine comprising a cylindrical stator having many gear teeth on its inner surface and a rotor having many gear teeth and provided within the stator is used, and a liquid to be foamed and an inactive gas are fed into the foaming machine simultaneously and continuously while rotating the rotor, and thereby a foamed liquid is taken out of the foaming machine continuously through an outlet. This method can be applied to the foaming of thermosetting resins other than polyurethane. Because inlets for liquids and inactive gases can be provided as needed, mixing of two or more kinds of liquids and inactive gases is possible. The liquid may have hardenability if it hardens after being discharged from the foaming machine.

It is preferable that the volume of the microbubbles of an inactive gas formed by the mechanical froth foaming method is from 10% to 70%, more preferably from 20% to 60% with respect to the volume of the molded product (total volume of the inactive gas and the resin molded product). When it is at least 10%, machinability or grindability is excellent, since machinability or grindability is improved by decreased density. When it is not more than 70%, uniformly dispersed fine bubbles are easy to obtain, and properties as a resin molded product for material of a model are excellent.

Because little dust scatters at the time of cutting or grinding, the resin molded product for material of a model according to the present invention may be cut or ground by an NC machine or the like, and used suitably as a material of a model such as a mock-up model that is a real size model of an automobile or a household electric appliance, or a master model to be an original pattern of a mold.

The conditions of cutting or grinding a material with an NC machine are as follows: For example, in the case of an end mill using a cutter with a diameter of 20 mm, the cutter is rotated at 1000 rpm to 10,000 rpm, and the feed rate is approximately from 1000 mm/min to 10,000 mm/min.

The present invention is described further with reference to the following examples; however, the present invention is not limited to these examples. The parts in the examples are based on mass.

[Used Raw Materials]

Microcapsules (B1): Microcapsules having an average particle size of 500 μm and containing 60% of encapsulated oil, and comprising an encapsulated material of squalane and a wall material of polymethyl methacrylate ("Matsumoto Microsphere SQH", manufactured by MATSUMOTO YUSHI-SEIYAKU CO., Ltd.)

Microcapsules (B2): Microcapsules having an average particle size of 35 μm and containing 80% of an encapsulated oil, and comprising an encapsulated material of a liquid paraffin and a wall material of polymethyl methacrylate ("Matsumoto Microsphere MO", manufactured by MATSUMOTO YUSHI-SEIYAKU CO., Ltd.)

Dust-scattering reducer: polyethylene glycol dioleate (the number-average molecular weight of the polyethylene glycol: 600).

Polyol: Polyether polyol having a hydroxyl value of 400 in which PO is added to glycerol.

Organic polyisocyanate: Polymethylene polyphenyl isocyanate ("Millionate MR-200", manufactured by NIPPON POLYURETHANE INDUSTRY CO., LTD.)

Inorganic filler (C1): Calcium carbonate ("Whiton SB", manufactured by Shiraishi Calcium Co., Ltd.)

Hollow microsphere (C2): Acrylic microballoon with an average particle size of 20 μm and a density of 0.24 ("Matsumoto Microsphere MFL-80GCA", manufactured by MATSUMOTO YUSHI-SEIYAKU CO., Ltd.)

Dehydrating agent (C3): Molecular sieve ("Molecular Sieve 3A–B Powder", manufactured by UNION SHOWA K.K.)

Foam stabilizer (C4): Silicone-based foam stabilizer ("SZ-1931", manufactured by NIPPON UNICAR COMPANY, LTD.)

Catalyst (C5): Di-n-butyl tin dilaurate ("StannBL", manufactured by SANKYO ORGANIC CHEMICALS CORPORATION).

[Amount of scattering dust]: A molded product was cut with a bandsaw, and 5 g of the sawdust generated at this time was put in a 300 ml glass bottle, and then the bottle was capped. The bottle was shaken vigorously up-and-down several times and allowed to stand still, and 3 seconds later, evaluation of ○, Δ and X was made based on the amount of the dust flying in the bottle. The symbol ○ indicates that little dust is flying; Δ indicates that a small amount of dust is flying; and X indicates that a considerable amount of dust is flying.

[Bending strength]: In accordance with JIS K6911, bending strength was measured using "Shimadzu AUTOGRAPH AGS-500A" manufactured by Shimadzu Corporation.

[Izod impact strength]: In accordance with JIS K6911, Izod impact strength was measured using "Izod impact tester" manufactured by TOYO SEIKI SEISAKU-SHO, Ltd. (no notch).

EXAMPLES 1 TO 5

With the recipe described in Table 1, respective materials were put in a planetary mixer, and stirred at 130 rpm for 10 minutes. Thereafter, it was defoamed by stirring at not more than 30 mmHg for 5 minutes to obtain a polyol component. An isocyanate component also was obtained in the same manner.

Next, the polyol component and the isocyanate component were fed into a planetary mixer at the ratio specified in Table 1 so that the total amount of these components became 1000 g. They were mixed at not more than 30 mmHg and at 130 rpm for 5 minutes. The mixture was poured into a mold of 50 mm×50 mm×200 mm, and cured by heating at 80° C. for 2 hours. This was allowed to stand at room temperature for 8 hours to cool, and removed from the mold to obtain a molded product. The evaluation result of each molded product is shown in Table 1.

EXAMPLE 6

A polyol component and an isocyanate component were obtained in the same manner as in Examples 1 to 5 with the mass parts specified in Table 1.

Next, while rotating the rotor of a mechanical froth machine ("MF-350 mechanical froth foaming apparatus", manufactured by TOHO MACHINERY CO., Ltd.) at 300 rpm, the polyol component and the isocyanate component were continuously fed into an inlet of the mixing head in total amount of 10 to 20 L/min, with a dry air at the ratio specified in Table 1.

Then, the mixture solution in which fine bubbles were dispersed uniformly and which was discharged continuously through the outlet was poured into a mold of 50 mm×50 mm×200 mm, and cured by heating at 80° C. for 2 hours. This was allowed to stand at room temperature for 8 hours to cool, and removed from the mold to obtain a molded product. The evaluation results of the molded product is shown in Table 1.

COMPARATIVE EXAMPLES 1 TO 3

With the mass parts specified in Table 1, molded products were obtained in the same manner as in Examples 1 to 5. The evaluation results are shown in Table 1.

COMPARATIVE EXAMPLE 4

With the mass parts specified in Table 1, a molded product was obtained in the same manner as in Example 6. The evaluation results are shown in Table 1.

TABLE 1

| | Example | | | | | | Comp. Example | | | |
|---|---|---|---|---|---|---|---|---|---|---|
| | 1 | 2 | 3 | 4 | 5 | 6 | 1 | 2 | 3 | 4 |
| Polyol Component | | | | | | | | | | |
| Polyol | 48.5 | 48.5 | 47.5 | 43.5 | 43.5 | 48.0 | 49.8 | 44.5 | 39.5 | 49.8 |
| Microcapsules (B1) | 2.5 | | 4.8 | 2.5 | 2.5 | 2.5 | | | | |
| Microcapsules (B2) | | 2.5 | | | | | | | | |
| Dust-scattering reducer | | | | | | | | 10.0 | 20.0 | |
| Inorganic filler (C1) | | | | 10.0 | | | | | | |
| Hollow microsphere (C2) | | | | | 5.0 | | | | | |
| Dehydrating agent (C3) | 0.5 | 0.5 | 0.5 | 0.5 | | 0.5 | 0.4 | 1.0 | 1.0 | 0.4 |
| Foam stabilizer (C4) | | | | | | 1.0 | | | | |
| Catalyst (C5) | 0.02 | 0.02 | 0.02 | 0.02 | 0.02 | 0.02 | 0.02 | 0.02 | 0.01 | 0.02 |
| Isocyanate Component | | | | | | | | | | |
| Organic polyisocyanate | 48.5 | 48.5 | 47.5 | 43.5 | 43.5 | 48.0 | 49.8 | 44.5 | 39.5 | 49.8 |
| Hollow microsphere (C2) | | | | | 5.0 | | | | | |
| Amount of air (volume %) | | | | | | 30 | | | | 30 |
| Evaluation Result of Molded Product | | | | | | | | | | |
| Density (g/cm$^3$) | 1.15 | 1.16 | 1.14 | 1.27 | 0.95 | 0.85 | 1.17 | 1.15 | 1.13 | 0.84 |
| Hardness (Shore D) | 87 | 87 | 86 | 85 | 79 | 70 | 88 | 78 | 70 | 70 |
| Amount of scattering dust | ○ | ○ | ○ | ○ | ○ | ○ | x | Δ | ○ | x |
| Bending strength (kgf/cm$^2$) | 1040 | 1042 | 1010 | 1100 | 750 | 500 | 1050 | 820 | 660 | 505 |
| Izod impact strength (kgfcm/cm$^2$) | 32 | 31 | 30 | 30 | 22 | 15 | 34 | 16 | 10 | 15 |

INDUSTRIAL APPLICABILITY

According to the present invention, a resin molded product for material of a model that generates a very small amount of scattering dust when being cut or ground can be obtained. When using this material, the working environment for cutting or grinding is not contaminated by dust. Therefore, there is no fear that generated dust rides on an air stream developed by rotation of a cutter and floats in the air, and scatters in the working place over a wide range and is absorbed by a worker to damage his/her health. Also, there is no fear that generated dust enters a driving section or a control section of an NC machine to cause malfunction. Thus, the present invention has effects in maintaining the health of the workers and preventing problems for a cutting or grinding machine.

Unlike the conventional method in which a dust-scattering reducer in liquid state is included in a resin, in the present invention, microcapsules containing a liquid material are put in a resin. Therefore, there is little decrease in the properties of the resin. Thus, the resin molded product obtained can be used suitably for a material requiring strength, such as a master model for casting or a checking fixture.

Thus, the present invention is used suitably for a resin-forming material and a resin molded product for material of model that are suitable for cutting or grinding.

What is claimed is:

1. A molded product for material of a model which is a thermosetting resin molded product wherein a total volume of 10% to 70% microbubbles of an inactive gas with respect to a volume of the molded produce are dispersed uniformly in the molded product by a mechanical froth method, and which is formed by melting and solidifying or hardening and shaping a machinable or grindable resin-forming material, that provides a resin molded product, comprising
    (A) a machinable or grindable resin or a precursor thereof; and
    (B) microcapsules comprising an encapsulated material (a) in liquid state at 20° C. and a wall material (b):
    wherein the machinable or grindable resin-forming material includes (B) at a ratio of 0.5 to 90 mass parts with respect to 100 mass arts of (A), and (a) is at least one selected from the group consisting of hydrocarbons, alcohols, esters, ketones (poly)ethers, mineral oils or purified products thereof, and animal oils, plant oils or purified or modified products thereof.

2. A method for producing a model, which comprises cutting or grinding the molded product of claim 1.

3. The molded product according to claim 1, wherein (a) comprises an organic compound having a viscosity at 20° C. of not more than 5000 mPa·s and a number-average molecular weight of not more than 3000.

4. The molded product according to claim 1, wherein (b) is a thermosetting resin, and (a) has a freezing point of not higher than −5° C. and a boiling point of not lower than 80° C.

5. The molded product according to claim 1, wherein (B) have an average particle size of 1 $\mu$M to 1500 $\mu$m.

6. The molded product according to claim 1, wherein an amount of an encapsulated oil in (B) is at least 40 volume % with respect to the volume of (B).

7. The molded product according to claim 1, wherein (A) is a hard resin with a shore D Hardness of at least 60 or a precursor thereof.

8. The molded product according to claim 1, wherein (A) includes at least one additive (C) selected from fillers, dehydrating agents, lubricants, foam stabilizers, defoaming agents, catalysts, coloring agents, flame retardants, age resistors and plasticizers.

9. In the method for producing a model according to claim 2, the improvement comprising adding microcapsules (B) comprising an encapsulated material (a) in liquid state and a wall material (b) into the resin molded product whereby an amount of scattering dust when cutting or grinding is reduced.

10. The molded product according to claim 1, wherein said resin molded product has a low tendency to produce dust in the air during cutting and grinding.

11. The molded product according to claim 1, wherein the encapsulated material (a) is at least one selected from the group consisting of hydrocarbons, alcohols, esters, ketones, mineral oils or purified products thereof, and animal oils, plant oils or purified or modified products thereof.

* * * * *